United States Patent [19]

Hamanaka

[11] Patent Number: 4,999,006
[45] Date of Patent: Mar. 12, 1991

[54] COHERENT OPTICAL APPARATUS
[75] Inventor: Kenjiro Hamanaka, Tsukuba, Japan
[73] Assignee: Nippon Sheet Glass Co., Ltd., Osaka, Japan
[21] Appl. No.: 361,940
[22] Filed: Jun. 6, 1989
[51] Int. Cl.⁵ ............................................. G02B 27/42
[52] U.S. Cl. .................... 350/162.12; 350/167
[58] Field of Search ............ 350/3.82, 162.12, 162.14, 350/162.15, 162.16, 167; 364/822

[56] References Cited

U.S. PATENT DOCUMENTS 3,743,422 7/1973 Wood .............................. 350/162.12
4,851,978 7/1989 Ichihara ............................. 350/167

Primary Examiner—Bruce Y. Arnold
Assistant Examiner—J. P. Ryan
Attorney, Agent, or Firm—Woodcock Washburn Kurtz Mackiewicz & Norris

[57] ABSTRACT

A coherent optical apparatus of this invention includes first and second lenses located before and after a transmission object in which at least one of a transmittivity or phase is spatially distributed, and a microlens array located before the first lens. Upon illumination of coherent light on the microlens array, a plurality of high-quality, clear Fourier transform patterns can be obtained with a simple arrangement.

6 Claims, 2 Drawing Sheets

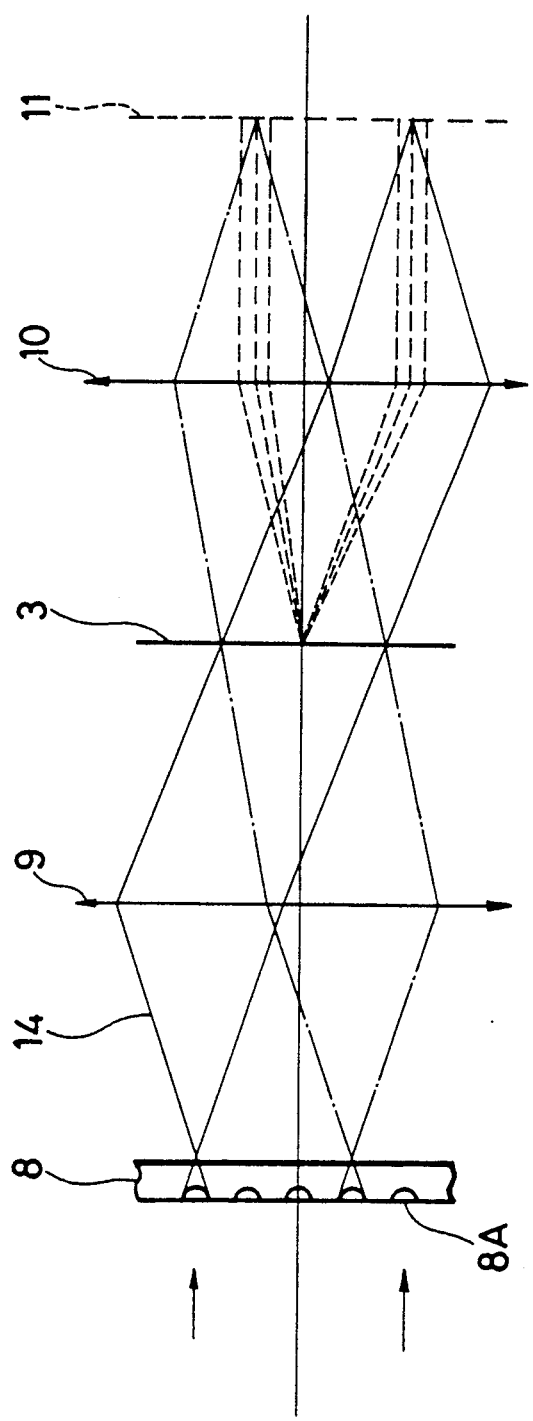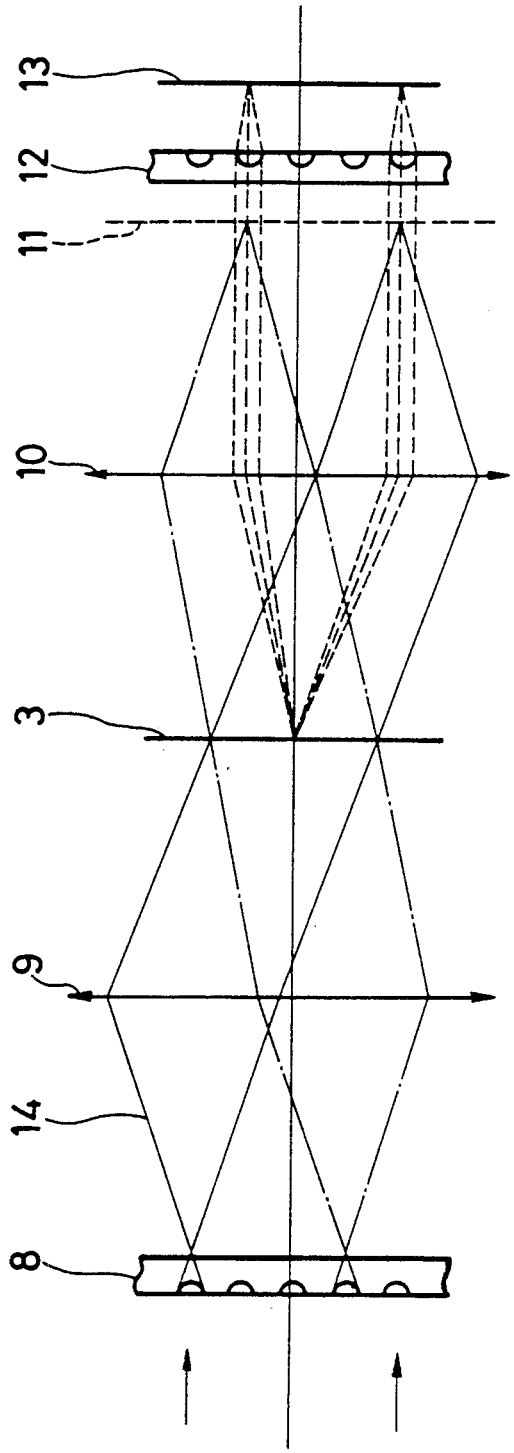

COHERENT OPTICAL APPARATUS

BACKGROUND OF THE INVENTION

1. Field of the Invention

The present invention relates to an optical apparatus capable of simultaneously obtaining a plurality of Fourier transform patterns of a transmission object under illumination of coherent light.

2. Description of the Prior Art

In the field of optical information processing or so-called "optical computing", there is an approach to a high-speed matrix operation, an interimage operation and the like utilizing a parallelistic property of light. For example, there is an approach to simultaneously obtaining a plurality of Fourier transform patterns of an image (transmission object) which is formed into information by a transmittivity or a phase and causing each pattern to perform a predetermined image operation.

For this purpose, an optical apparatus capable of simultaneously obtaining a plurality of Fourier transform patterns of a transmission object with a simple arrangement is necessary.

A known conventional apparatus of this type is shown in FIG. 1 or 2.

Referring to FIG. 1, coherent light emitted from an HeNe laser 1 is spatially expanded into a collimated light beam by a beam expander 2 and illuminates a transmission object 3. Two-dimensional matrix pin hole array 4 is located immediately after the transmission object 3, and a lens 5 is arranged thereafter. The transmission object 3 is arranged near a front focal surface of the lens 5. With this arrangement, a plurality of Fourier transform patterns of the transmission object 3 are obtained on a rear focal surface 6 of the lens 5.

Assuming that a complex transmittivity of the transmission object 3 is f(x,y) and a pin hole diameter of the pin hole array 4 is sufficiently small, f(x,y) sampled by the pin hole array 4 is represented as follows by using a Dirac function:

$$f(x,y) \sum_{m=-\infty}^{\infty} \sum_{n=-\infty}^{\infty} \delta(x - mp, y - nq) \quad (1)$$

(1)

where each of p and q is the pitch of a pin hole.

Therefore, a Fourier transform pattern of relation (1) obtained by the lens 5 is given as follows assuming that F(ξ,n) is a Fourier transform of f(x,y):

$$F(\xi, \eta) * \sum_{m=-\infty}^{\infty} \sum_{n=-\infty}^{\infty} \delta(\xi - m/p', \eta - n/q') \quad (2)$$

(2)

That is, a plurality of Fourier transform patterns $F(\xi,\eta)$ of f(x,y) are obtained on the (ξ,η) plane, i.e., the rear focal surface of the lens 5.

In the above relation, symbol * represents convolution. Each of 1/p' and 1/q' represents the pitch between patterns $F(\xi,\eta)$ on the Fourier transform surface. In this case, p and q are proportional to p' and q', respectively. Therefore, the pitch between the pin hole array is inversely proportional to the pitch between the Fourier transform patterns.

FIG. 2 shows another conventional technique capable of obtaining a plurality of Fourier transform patterns by using a computer hologram.

A collimated coherent light beam obtained by an arrangement similar to that shown in FIG. 1 illuminates the transmission object 3. A computer hologram 7 is arranged after the transmission object 3.

The computer hologram 7 is so coded as to reproduce matrix point array at a position separated from a hologram surface by a predetermined interval when collimated coherent illumination is used as reference light. More specifically, as shown in FIG. 3, a pattern in which a plurality of so-called Fresnel zone plates overlap to be offset from each other is recorded. In FIG. 3, only two patterns are shown for illustrative simplicity.

With the above arrangement, a Fourier transform pattern of the transmission object 3 can be obtained about each point reproduced by the computer hologram.

The apparatus shown in FIG. 1, however, is problematic because an amount of light transmitted through the pin hole to sample the object is significantly small and therefore the obtained Fourier transform pattern is very dark.

When a pin hole diameter is increased to solve this problem, Fourier transform $H(\xi,\eta)$ of a complex transmittivity h (x,y) of the pin hole is added to the Fourier transform pattern. As a result, relation 2 is rewritten as follows:

$$F(\xi, \eta) H(\xi, \eta) * \sum_{m=-\infty}^{\infty} \sum_{n=-\infty}^{\infty} \delta(\xi - m/p', \eta - n/q') \quad (3)$$

That is, when the pin hole h(x,y) is enlarged, the cutoff frequency of the Fourier transform $H(\xi,\eta)$ moves to a low-frequency side. Therefore, the obtained Fourier pattern lacks high-frequency information.

With the arrangement shown in FIG. 2, the computer hologram in which a plurality of Fresnel zone plates overlap each other is used to obtain a plurality of Fourier transform patterns. In this case, in addition to the +1st diffracted light component required to obtain the Fourier transform patterns, unnecessary diffracted light components such as 0th, −1st and +2nd diffracted light components are generated. In addition, diffracted light is generated due to mutual interference (so-called moire) between the zone plates. As a result, noise patterns of these unnecessary diffracted light components significantly overlap the Fourier transform patterns.

SUMMARY OF THE INVENTION

A microlens array in which a plurality of microlenses are one- or two-dimensionally aligned on a single plane is arranged under coherent illumination. A first single lens, a transmission object and a second single lens are arranged after the lens array in the order named.

The first lens has a lens diameter sufficient to transmit at least two light beams of coherent light beams emitted from the microlenses of the lens array.

The transmission object is arranged in an area illuminated simultaneously by at least two light beams of the light beams emitted from the microlenses of the lens array and transmitted through the first lens.

The second lens has a lens diameter sufficient to transmit at least two light beams of the light beams emitted from the microlenses of the lens array and transmitted through the first lens and the transmission object.

In an optical system having the above arrangement, at least two Fourier transform patterns of the transmission object are simultaneously formed after the second lens.

With this arrangement, a plurality of Fourier transform patterns of the transmission object can be obtained with a sufficient light amount without unnecessary stray light, while a space frequency distribution of each Fourier transform pattern is uniform.

According to the present invention, a plurality of clear Fourier transform patterns having sufficient light amounts can be obtained while unnecessary noise light components do not overlap each other, without using the pin hole array or a computer hologram conventionally required to form a plurality of Fourier transform patterns.

The present invention can be obtained by two lenses and a microlens array. The microlens array can be manufactured by, e.g., plastic molding or manufactured as a gradient index lens array in a glass plate using an ion exchanging technique. Therefore, the microlens array can be manufactured more easily than the computer hologram.

As described above, according to the present invention, a plurality of high-quality, clear Fourier transform patterns can be obtained with a simple arrangement.

BRIEF DESCRIPTION OF THE DRAWINGS

FIG. 4 is a side sectional view showing an embodiment of the present invention; and FIG. 5 is a side sectional view showing another embodiment of the present invention.

DETAILED DESCRIPTION OF THE PREFERRED EMBODIMENTS

Figure 1:
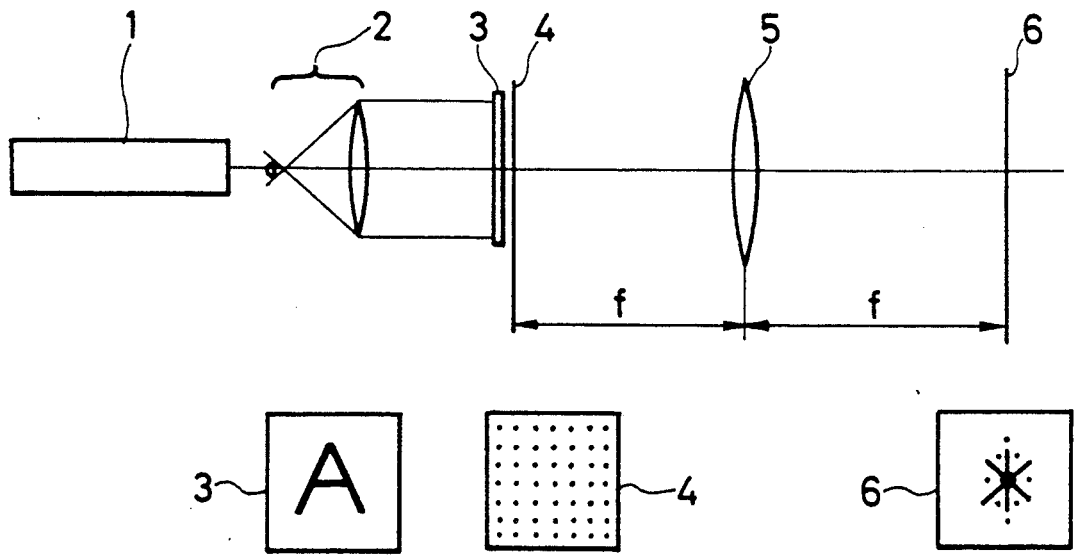
FIG. 1 is a side sectional view showing a conventional apparatus.
Figure 2:
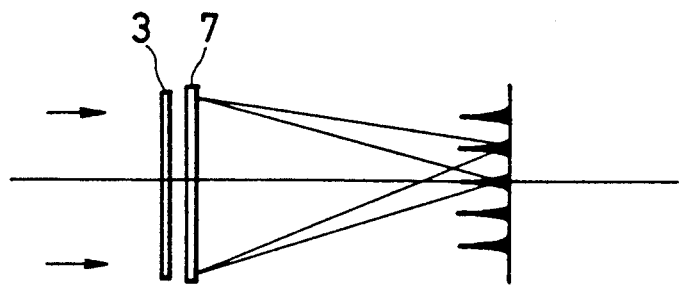
FIG. 2 is a side sectional view showing another conventional apparatus.
Figure 3:
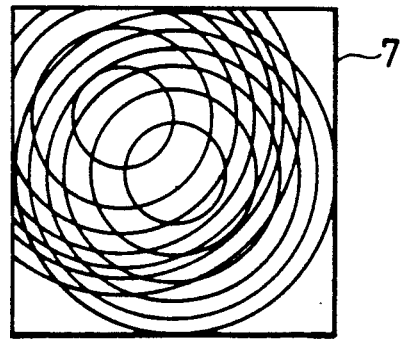
FIG. 3 is a front view showing a computer hologram used in the apparatus shown in FIG. 2.

An embodiment of the present invention will be described below with reference to the accompanying drawings.

Referring to FIG. 4, a microlens array 8 in which a plurality of microlenses are one- or two-dimensionally arranged in a single plane is illuminated with collimated coherent light. Illumination may be the same as in conventional apparatuses. Each beam 14 transmitted through the microlens array 8 is converged into convergent light by each lens 8A, focused and then diverged to be divergent light. A first lens 9 is located after the microlens array 8. The first lens 9 is located such that a front focal surface of the first lens substantially coincides with a rear focal surface of the microlens array 8. A pupil surface of the first lens 9 has a size sufficient to receive all light beams emitted from the lenses of the microlens array 8 and diverged toward the first lens.

The beams 14 emitted from the lenses of the microlens array 8 are collimated by the first lens 9 and spatially overlapped at the rear focal position of the first lens 9. A transmission object 3 as an input image to be formed into Fourier transform patterns is located at this position.

A second lens 10 is located after the transmission object 3. The transmission object 3 is located near the a front focal surface of the second lens 10. The size of a pupil surface of the second lens 10 is sufficient to receive all light beams transmitted through the microlenses, the first lens 9 and the transmission object 3.

Since the optical elements are arranged as described above, a plurality of Fourier transform patterns of the transmission object 3 are simultaneously obtained at a Fourier transform surface 11, i.e., at the rear focal position of the second lens 10.

In the above first embodiment, the respective elements are separated from each other by a distance corresponding to a focal length of the first or second lens 9 or 10. However, a distance between, e.g., the transmission object 3 and the second lens 10 can be shortened. That is, an arrangement of the respective elements can be arbitrarily changed in accordance with the size of Fourier transform patterns to be formed or the interval therebetween.

In order to obtain a plurality of duplicate images of an object under coherent illumination, a second microlens array 12 is arranged in correspondence with the respective Fourier transform patterns as shown in FIG. 5. As a result, a plurality of coherent duplicate images of the transmission object 3 can be obtained on an image surface 13 at a rear focal position of the second microlens array 12.

What is claimed is:

1. A coherent optical apparatus comprising:
    a microlens array located under coherent illumination and obtained by one- or two-dimensionally arranging microlenses which are integrally formed as a gradient index lens array in a transparent planar substrate;
    a first lens located after said microlens array;
    a transmission object located after said first lens, at least one of a transmittivity or phase of said transmission object being spatially distributed; and
    a second lens located after said transmission object,
    wherein said first lens has a lens diameter for allowing at least two light beams of coherent light beams emitted from said microlenses of said microlens array to transmit through said first lens, said transmission object is located in an area illuminated simultaneously with at least two light beams of the light beams emitted from said microlenses and transmitted through said first lens, and said second lens transmits at least two light beams of the light beams emitted from said microlenses and transmitted through said first lens and said transmission object and simultaneously forms at least two Fourier transform patterns of said transmission object after said second lens.

2. An apparatus according to claim 1, wherein said transmission object is located on a rear focal surface of said first lens and a front focal surface of said second lens.

3. An apparatus according to claim 1, wherein said transmission object is located closer to said first lens than a rear focal surface of said first lens and closer to said second lens than a front focal surface of said second lens.

4. An apparatus according to any one of claims 1 to 3, wherein said microlens array is a gradient index lens array formed in a glass plate.

5. An apparatus according to claim 4 wherein the gradient index lens array formed in a glass plate is made using an ion exchanging technique.

6. An apparatus according to claim 1, further comprising a second microlens array located after said Fourier transform patterns and obtained by arranging microlenses in correspondence with said Fourier transform patterns,
    wherein said second microlens array transmits the light beams forming said Fourier transform patterns and simultaneously forms at least two coherent duplicate images of said transmission object after said second microlenses.

* * * * *